US012744655B2

(12) United States Patent
Zhang et al.

(10) Patent No.: US 12,744,655 B2
(45) Date of Patent: Sep. 22, 2026

(54) COMMUNICATION DEVICE, COMMUNICATION SYSTEM, AND OPTICAL MODULE

(71) Applicant: HUAWEI TECHNOLOGIES CO., LTD., Shenzhen (CN)

(72) Inventors: Hui Zhang, Dongguan (CN); Fanhua Kong, Wuhan (CN); Fei Yu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 269 days.

(21) Appl. No.: 18/604,576

(22) Filed: Mar. 14, 2024

(65) Prior Publication Data

US 2024/0223349 A1 Jul. 4, 2024

Related U.S. Application Data

(63) Continuation of application No. PCT/CN2022/112822, filed on Aug. 16, 2022.

(30) Foreign Application Priority Data

Sep. 15, 2021 (CN) ........................ 202111082487.9

(51) Int. Cl.
*H04L 7/00* (2006.01)

(52) U.S. Cl.
CPC .................................. *H04L 7/0075* (2013.01)

(58) Field of Classification Search
CPC ..... H04L 1/02; H04L 1/12; H04L 5/02; H04L 5/06; H04L 5/14; H04L 5/22; H04L 7/02;
(Continued)

(56) References Cited

U.S. PATENT DOCUMENTS 7,356,213 B1 * 4/2008 Cunningham ........ H10W 72/00 385/14
7,817,880 B1 * 10/2010 Drost ....................... G02B 6/43 398/139

(Continued)

FOREIGN PATENT DOCUMENTS

CN 106059673 A 10/2016
CN 216700004 U * 6/2022

(Continued)

OTHER PUBLICATIONS

Sang-Hoon Lee et al., "A Serial Optical Link Based Memory Test System for High-Speed and Multi-Parallel Test," Sep. 29, 2009, Journal of Lightwave Technology, vol. 28, No. 1, Jan. 1, 2010, pp. 104-109.*

(Continued)

*Primary Examiner* — Omar S Ismail

(57) ABSTRACT

A communication device includes a processing module, at least one optical module, and at least one connection apparatus. Each of the at least one optical module is connected to the processing module by using a corresponding connection apparatus. The processing module is configured to: provide an electrical signal for each optical module, or receive an electrical signal provided by the optical module. Each optical module is configured to: convert the electrical signal provided by the processing module into an optical signal and then send the optical signal, or convert a received optical signal into an electrical signal and then provide the electrical signal for the processing module. The connection apparatus corresponding to each optical module is configured to: transmit the electrical signal provided by the processing module to each optical module, or transmit the electrical signal provided by each optical module to the processing module.

19 Claims, 7 Drawing Sheets

(58) Field of Classification Search

CPC ..... H04L 7/04; H04L 9/14; H04L 9/18; H04L 9/28; H04L 9/20; H04L 12/02; H04L 12/28; H04L 12/50; H04L 12/16; H04L 12/40; H04L 12/42; H04L 13/02; H04L 15/04; H04L 15/24; H04L 15/06; H04L 15/12; H04L 15/18; H04L 15/28; H04L 17/02; H04L 17/04; H04L 17/12; H04L 17/16; H04L 25/02; H04L 25/30; H04L 25/38; H04L 25/40; H04L 25/52; H04L 25/32; H04L 25/03; H04L 25/20; H04L 27/02; H04L 27/10; H04L 27/18; H04L 27/26; H04L 27/32; H04L 27/14; H04L 27/144; H04L 27/22; H04L 27/34; H04L 41/02; H04L 41/04; H04L 41/06; H04L 41/08; H04L 41/12; H04L 41/14; H04L 41/0246; H04L 41/0654; H04L 41/0803; H04L 41/085; H04L 41/0866; H04L 41/0813; H04L 41/0823; H04L 41/34; H04L 41/50; H04L 41/5003; H04L 41/5041; H04L 41/5061; H04L 41/5019; H04L 43/02; H04L 43/04; H04L 43/06; H04L 43/08; H04L 43/10; H04L 43/0805; H04L 43/0823; H04L 43/0852; H04L 43/0876; H04L 43/022; H04L 43/50; H04L 45/02; H04L 45/12; H04L 45/24; H04L 45/036; H04L 45/037; H04L 45/48; H04L 45/58; H04L 45/645; H04L 45/74; H04L 45/745; H04L 45/7453; H04L 45/80; H04L 45/85; H04L 47/10; H04L 47/50; H04L 47/70; H04L 49/10; H04L 49/20; H04L 49/15; H04L 49/25; H04L 49/35; H04L 49/50; H04L 49/55; H04L 49/90; H04L 51/04; H04L 51/06; H04L 51/07; H04L 51/21; H04L 61/09; H04L 61/30; H04L 61/45; H04L 61/50; H04L 65/10; H04L 65/1066; H04L 65/40; H04L 65/60; H04L 67/50; H04L 67/2866; H04L 67/14; H04L 67/01; H04L 69/08; H04L 69/16; H04L 69/30; H04L 101/60; H04L 101/30

See application file for complete search history.

(56) References Cited

U.S. PATENT DOCUMENTS

| | | | | |
|---|---|---|---|---|
| 7,840,136 | B1 * | 11/2010 | Cunningham | H04Q 11/0005 385/16 |
| 11,101,912 | B2 * | 8/2021 | Stojanovic | H04J 14/0307 |
| 11,895,798 | B2 * | 2/2024 | Winzer | G02B 6/428 |
| 11,988,874 | B2 * | 5/2024 | Winzer | G02B 6/3608 |
| 2003/0038297 | A1 * | 2/2003 | Carroll | G02B 6/26 257/99 |
| 2007/0233906 | A1 * | 10/2007 | Tatum | G06F 13/28 710/26 |
| 2008/0044141 | A1 * | 2/2008 | Willis | G02B 6/3887 385/94 |
| 2011/0249980 | A1 * | 10/2011 | Takemoto | H04B 10/503 398/201 |
| 2014/0270784 | A1 * | 9/2014 | Thacker | H04B 10/27 398/115 |
| 2015/0071649 | A1 | 3/2015 | Lee et al. | |
| 2017/0059889 | A1 * | 3/2017 | Nagarajan | G02F 1/2255 |
| 2017/0131494 | A1 | 5/2017 | Hsieh et al. | |
| 2018/0183443 | A1 * | 6/2018 | Tebbe | C07K 16/2878 |
| 2018/0287705 | A1 | 10/2018 | Lin et al. | |
| 2018/0331494 | A1 | 11/2018 | Ho et al. | |
| 2019/0041594 | A1 * | 2/2019 | Li | G02B 6/43 |
| 2019/0108161 | A1 * | 4/2019 | Nagarajan | G06F 13/4282 |
| 2019/0159334 | A1 | 5/2019 | Kagaya | |
| 2019/0190611 | A1 | 6/2019 | Nakai et al. | |
| 2022/0159860 | A1 * | 5/2022 | Winzer | G02B 6/428 |
| 2022/0244465 | A1 * | 8/2022 | Winzer | G02B 6/3608 |

FOREIGN PATENT DOCUMENTS

| | | | | |
|---|---|---|---|---|
| CN | 115191090 | A | | 10/2022 |
| JP | 2006243669 | A | * | 9/2006 |
| JP | 2010040841 | A | | 2/2010 |
| JP | 2014067561 | A | | 4/2014 |
| JP | 6223671 | B2 | | 11/2017 |

OTHER PUBLICATIONS

Mina Abdallah et al., "An all-digital semi-blind clock and data recovery system," Feb. 18, 2015, Microelectronics Journal 46 (2015), pp. 273-280.*

John H. Lau, "Embedded 3D Hybrid IC Integration System-in-Package (SiP) for Opto-Electronic Interconnects in Organic Substrates ," Apr. 30, 2012, Proceedings of the ASME 2010 International Mechanical Engineering Congress & Exposition,Nov. 12-18, 2010, Vancouver, British Columbia, Canada, pp. 1-6.*

Extended European Search Report dated Sep. 27, 2024, issued for European Application No. 22868929.5 (8 pages).

"2.67Gbps SFP Optical Transceiver,20kmReach GP-3148-L2x(D)",Feb. 28,2013,total 10 pages,https://www.gigalight.com/downloads/datasheets/optical-transceivers/sfp/2g/GP-3148-L2CD.pdf.

International Search Report dated Sep. 27, 2022, issued for International Application No. PCT/CN2022/112822 (10 pages).

* cited by examiner (a)

(b)

COMMUNICATION DEVICE, COMMUNICATION SYSTEM, AND OPTICAL MODULE

CROSS-REFERENCE TO RELATED APPLICATIONS

This application is a continuation of International Application No. PCT/CN2022/112822, filed on Aug. 16, 2022, which claims priority to Chinese Patent Application No. 202111082487.9, filed on Sep. 15, 2021. The disclosures of the aforementioned applications are hereby incorporated by reference in their entireties.

TECHNICAL FIELD

This disclosure relates to the field of communication technologies, and in particular, to a communication device, a communication system, and an optical module.

BACKGROUND

Currently, a communication device usually includes a main chip and an optical module that process a service. Referring to FIG. 1, in an existing communication device, a main chip and an optical module are connected through a printed circuit board (PCB). Optical digital signal processing (ODSP) or clock data recovery (CDR) in the optical module is generally used to improve quality of a digital signal or an analog signal, so that bit errors are reduced when the signal with improved quality is transmitted to the main chip through the PCB for processing. Because the PCB has a large signal transmission loss, the ODSP or the CDR in the optical module improves the quality of the digital signal or the analog signal, and mainly compensates for a loss of the digital signal or the analog signal transmitted on the PCB.

As a capacity and a rate of the communication system increase, the signal transmission loss of the PCB also increases. Consequently, power consumption required by the ODSP or the CDR in the optical module to improve the quality of the digital signal or the analog signal is increasingly high. The ODSP or the CDR occupies approximately 50% of a volume of the optical module. The increase of the power consumption of the ODSP or the CDR also increases a difficulty in heat dissipation of the communication device.

SUMMARY

This disclosure provides a communication device, a communication system, and an optical module, which may have a high-rate signal transmission capability, relatively low costs, and a low heat dissipation requirement.

According to a first aspect, this disclosure provides a communication device, including: a processing module, at least one optical module, and at least one connection apparatus. Each of the at least one optical module is connected to the processing module by using a corresponding connection apparatus. The processing module is configured to: provide an electrical signal for the optical module, or receive an electrical signal provided by the optical module. Each optical module is configured to: convert the electrical signal provided by the processing module into an optical signal and then send the optical signal, or convert a received optical signal into an electrical signal and then provide the electrical signal for the processing module. The connection apparatus corresponding to each optical module is configured to: transmit the electrical signal provided by the processing module to each optical module, or transmit the electrical signal provided by each optical module to the processing module. The connection apparatus includes a coaxial cable or a flexible printed circuit. If the optical modules have a same distance to the processing module, a transmission signal loss of the connection apparatus that includes a low-loss transmission medium such as the coaxial cable or the flexible printed circuit is less than a signal transmission loss of a printed circuit board. Because the signal transmission loss of the connection apparatus is less than the signal transmission loss of the PCB, in a high transmission rate scenario, ODSP or CDR that has a high signal repair capability in the optical module may not be required. It can be learned that the communication device provided in this disclosure has low costs, and has a low heat dissipation requirement. In addition, a bit error rate can be ensured.

In a possible implementation, the processing module includes a serializer/deserializer apparatus serdes, and each optical module is connected to the serdes by using the corresponding connection apparatus. The serdes has an electrical signal medium-distance transmission capability or an electrical signal long-distance transmission capability.

In this embodiment of this disclosure, the communication system may be used in a high signal transmission rate scenario, and the medium-distance transmission capability may be a capability of a medium-distance transmission interface discussed by the Optical Networking Forum (OIF). Alternatively, the medium-distance transmission capability may indicate energy or power of a signal exchanged between the serdes in the processing module and the optical module, which conforms to energy or power of a signal exchanged between a main chip and the optical module in a scenario that exceeds 10 Gbps in an optical networking communication standard, for example, 20 dB. The long-distance transmission capability may be a capability of a long-distance transmission interface discussed by the OIF. Alternatively, the long-distance transmission capability may indicate energy or power of a signal exchanged between the serdes in the processing module and the optical module, which conforms to energy or power of a signal exchanged between the main chip and the optical module in a scenario that exceeds 10 Gbps in the optical networking communication standard, for example, 28 dB.

Generally, the communication device further includes a PCB, and the processing module is disposed on the PCB. The connection apparatus corresponding to each optical module may include a first connector. The first connector may be connected to the processing module and the coaxial cable or the flexible printed circuit. The first connector may be located on the processing module, and is directly connected to the processing module to transmit an electrical signal. Alternatively, the first connector may be located on the PCB, and is connected to the processing module by using the PCB. Electrical connection can be implemented by using the PCB that is connected to the first connector and the processing module, to transmit an electrical signal.

In a possible implementation, the connection apparatus corresponding to each optical module further includes a second connector. The second connector may be configured to connect the corresponding optical module and the coaxial cable or the flexible printed circuit. The second connector may be detachably connected to the optical module. In this embodiment of this disclosure, the optical module may be a pluggable optical module.

In some examples, the second connector may be located on the PCB, and is directly fastened to the PCB. In some other examples, to make the optical module highly adapt to the processing module, the second connector may be fastened to the PCB by using a fastening apparatus. In this embodiment of this disclosure, the optical module may be an on-board optics module.

In a possible implementation, each optical module may be disposed at a position close to the processing module. For example, a distance between each optical module and the processing module may be less than or equal to a preset distance threshold. Generally, the preset distance threshold does not exceed 40 centimeters. In some examples, the preset distance threshold may alternatively not exceed 30 centimeters.

In a possible implementation, each optical module includes a first interface apparatus, a second interface apparatus, an optical signal transceiver apparatus, a control apparatus, and a power supply apparatus. The first interface apparatus is connected to the connection apparatus and is connected to the optical signal transceiver apparatus, and is configured to: transmit, to the optical signal transceiver apparatus, an electrical signal provided by the connection apparatus, or transmit, to the connection apparatus, an electrical signal provided by the optical signal transceiver apparatus. The second interface apparatus is connected to the optical signal transceiver apparatus and is connected to an external transmission medium, and is configured to: transmit, to the optical signal transceiver apparatus, an optical signal provided by the external transmission medium, or is configured to: transmit, to the external transmission medium, an optical signal provided by the optical signal transceiver apparatus. The external transmission medium is configured to transmit the optical signal. The optical signal transceiver apparatus is configured to: convert an optical signal into an electrical signal under control of the control apparatus, and then output the electrical signal to the first interface apparatus; or convert an electrical signal into an optical signal under control of the control apparatus, and send the optical signal by using the second interface apparatus. The power supply apparatus is configured to supply power to the optical signal transceiver apparatus and the control apparatus. The control apparatus is configured to control the optical signal transceiver apparatus.

Based on the foregoing structure of the optical module, the optical module in the communication device may have no digital signal processing sub-assembly or clock data recovery sub-assembly. In this embodiment of this disclosure, the optical module may have no ODSP or CDR, to reduce costs, a volume, a heat dissipation requirement of the optical module, and ensure the bit error rate by cooperating with the processing module.

In a possible implementation, the optical signal transceiver apparatus includes a signal amplification sub-assembly, a transmitter optical sub-assembly, and a receiver optical sub-assembly. A driver and a trans-impedance amplifier are integrated in the signal amplification sub-assembly, the driver is configured to drive the transmitter optical sub-assembly under control of the control apparatus, and the trans-impedance amplifier is configured to: amplify an electrical signal output by the receiver optical sub-assembly, and then output the electrical signal to the first interface apparatus. The transmitter optical sub-assembly is configured to: convert an electrical signal into an optical signal under driving of the driver, and send the optical signal by using the second interface apparatus. The receiver optical sub-assembly is configured to convert an optical signal into an electrical signal under control of the control apparatus. It can be learned that in this embodiment of this disclosure, the signal amplification sub-assembly has a relatively high integration level, and may occupy relatively small space of the optical module.

In a possible implementation, the optical signal transceiver apparatus includes a first sub-assembly and a second sub-assembly. The first sub-assembly includes a driver and a transmitter optical sub-assembly, the driver is configured to drive an optical transmitter circuit under control of the control apparatus, and the optical transmitter circuit is configured to: convert an electrical signal into an optical signal under driving of the driver, and then output the optical signal to the second interface apparatus. A trans-impedance amplifier and an optical receiver circuit are integrated in the second sub-assembly, the optical receiver circuit is configured to: convert an optical signal into an electrical signal under control of the control apparatus, and then output the electrical signal to the trans-impedance amplifier, and the trans-impedance amplifier is configured to: amplify an electrical signal output by a receiver optical sub-assembly, and then output the electrical signal to the first interface apparatus. It can be learned that in this embodiment of this disclosure, the second sub-assembly has a relatively high integration level, and may have a relatively small volume.

In a possible implementation, the transmitter optical sub-assembly includes an optical modulator and an optical source, and/or the receiver optical sub-assembly includes a trans-impedance amplifier and a photodiode.

In a possible implementation, the optical signal transceiver apparatus includes a driver, a trans-impedance amplifier, and an optical transceiver sub-assembly. The optical transceiver sub-assembly is configured to: convert an electrical signal into an optical signal under driving of the driver, and then output the optical signal to the second interface apparatus, or convert an optical signal into an electrical signal under control of the control apparatus, and then output the electrical signal to the trans-impedance amplifier. The driver is configured to drive the optical transceiver sub-assembly under control of the control apparatus. The trans-impedance amplifier is configured to: amplify the electrical signal output by the optical transceiver sub-assembly, and then output the electrical signal to the first interface apparatus. It can be learned that in this embodiment of this disclosure, the optical transceiver sub-assembly integrates a capability of converting an electrical signal into an optical signal and a capability of converting an optical signal into an electrical signal, to improve an integration level of the optical modules, and reduce a size of the optical module.

According to a second aspect, this disclosure provides a communication system, including the communication device according to the first aspect and any implementation of the first aspect and a first device. The first device exchanges an optical signal with the communication device.

According to a third aspect, this disclosure provides an optical module, used in a communication device, and including a first interface apparatus, a second interface apparatus, a first signal amplification apparatus, an optical signal transceiver apparatus, a control apparatus, and a power supply apparatus. The first interface apparatus is connected to a connection apparatus and is connected to the optical signal transceiver apparatus, and is configured to: transmit, to the optical signal transceiver apparatus, an electrical signal provided by the connection apparatus, or transmit, to the connection apparatus, an electrical signal provided by the optical signal transceiver apparatus. The connection apparatus includes a coaxial cable or a flexible printed circuit. The second interface apparatus is connected to the optical signal transceiver apparatus and is connected to an external transmission medium, and is configured to: transmit, to the optical signal transceiver apparatus, an optical signal provided by the external transmission medium, or is configured to: transmit, to the external transmission medium, an optical signal provided by the optical signal transceiver apparatus. The external transmission medium is configured to transmit the optical signal. The optical signal transceiver apparatus is configured to: convert an optical signal into an electrical signal under control of the control apparatus, and then output the electrical signal to the first interface apparatus; or convert an electrical signal into an optical signal under control of the control apparatus, and send the optical signal by using the second interface apparatus. The power supply apparatus is configured to supply power to the optical signal transceiver apparatus and the control apparatus. The control apparatus is configured to control the optical signal transceiver apparatus. The optical module has no optical digital signal processing (ODSP) sub-assembly or clock data recovery (CDR) sub-assembly.

In a possible implementation, the first interface apparatus is detachably connected to the connection apparatus.

In a possible implementation, the optical signal transceiver apparatus includes a signal amplification sub-assembly, a transmitter optical sub-assembly, and a receiver optical sub-assembly. A driver and a trans-impedance amplifier are integrated in the signal amplification sub-assembly, the driver is configured to drive the transmitter optical sub-assembly under control of the control apparatus, and the trans-impedance amplifier is configured to: amplify an electrical signal output by the receiver optical sub-assembly, and then output the electrical signal to the first interface apparatus. The transmitter optical sub-assembly is configured to: convert an electrical signal into an optical signal under driving of the driver, and send the optical signal by using the second interface apparatus. The receiver optical sub-assembly is configured to convert an optical signal into an electrical signal under control of the control apparatus.

In a possible implementation, the optical signal transceiver apparatus includes a first sub-assembly and a second sub-assembly. The first sub-assembly includes a driver and a transmitter optical sub-assembly, the driver is configured to drive an optical transmitter circuit under control of the control apparatus, and the optical transmitter circuit is configured to: convert an electrical signal into an optical signal under driving of the driver, and then output the optical signal to the second interface apparatus. A trans-impedance amplifier and an optical receiver circuit are integrated in the second sub-assembly, the optical receiver circuit is configured to: convert an optical signal into an electrical signal under control of the control apparatus, and then output the electrical signal to the trans-impedance amplifier, and the trans-impedance amplifier is configured to: amplify an electrical signal output by the receiver optical sub-assembly, and then output the electrical signal to the first interface apparatus.

In a possible implementation, the transmitter optical sub-assembly includes an optical modulator and an optical source, and/or the receiver optical sub-assembly includes a trans-impedance amplifier and a photodiode.

In a possible implementation, the optical signal transceiver apparatus includes a driver, a trans-impedance amplifier, and an optical transceiver sub-assembly. The optical transceiver sub-assembly is configured to: convert an electrical signal into an optical signal under driving of the driver, and then output the optical signal to the second interface apparatus, or convert an optical signal into an electrical signal under control of the control apparatus, and then output the electrical signal to the trans-impedance amplifier. The driver is configured to drive the optical transceiver sub-assembly under control of the control apparatus. The trans-impedance amplifier is configured to: amplify an electrical signal output by the optical transceiver sub-assembly, and then output the electrical signal to the first interface apparatus.

In a possible implementation, in a scenario in which the optical module is used in the communication device, the optical module may be disposed at a position close to a processing module. For example, a distance between the optical module and the processing module is less than a preset distance threshold. Generally, the preset distance threshold does not exceed 40 centimeters.

According to a fourth aspect, this disclosure provides a communication device, including the optical module according to any possible design in the third aspect. The optical module has no optical digital signal processing (ODSP) sub-assembly or clock data recovery (CDR) sub-assembly, and therefore has low costs, a low heat dissipation requirement, and a small size. Therefore, the communication device may not have an excessively high heat dissipation capability, and costs of the communication device may also be reduced, and occupied space may be reduced.

For a technical effect that can be achieved by any possible implementation in any one of the second aspect to the fourth aspect, refer to a technical effect that can be achieved by any possible implementation in the first aspect. Details are not described herein again.

DESCRIPTION OF EMBODIMENTS

Terms used in the following embodiments are merely intended to describe specific embodiments, but not to limit this disclosure. The terms "one", "a", "the", "the foregoing", "this", and "the one" of singular expressions used in this specification and the appended claims of this disclosure are also intended to include expressions such as "one or more", unless otherwise specified in the context clearly.

Reference to "an embodiment", "some embodiments", or the like described in this specification indicates that one or more embodiments of this disclosure include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise especially emphasized in another manner. The terms "include", "contain", "have", and their variants all mean "include but are not limited to", unless otherwise especially emphasized in another manner.

To make the objectives, technical solutions, and advantages of this disclosure clearer, the following further describes this disclosure in detail with reference to the accompanying drawings. For ease of understanding of a connector provided in embodiments of this disclosure, the following first describes an application scenario of the connector.

Figure 1:
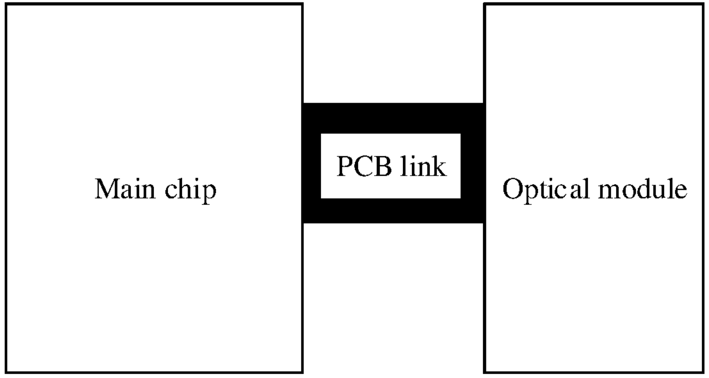
FIG. 1 is a schematic diagram of a structure of an existing communication device.

Referring to FIG. 1, in an existing communication device, a main chip and an optical module are connected by using a PCB line; and ODSP or CDR is used to repair a signal with poor quality (or degraded) after being transmitted through an optical fiber, to ensure that a received digital/analog signal has as few bit errors as possible. Then, the recovered signal is transmitted to a main chip (master service processing chip) through a pluggable optical module interface and the PCB line for switching/routing protocol processing. Theoretically, the ODSP or the CDR in the optical module can be regarded as a signal repeater.

As a system capacity increases, a signal transmission rate of the optical module increases from current 25 GE to 100 GE, 400 GE, or even 800 GE. As the system capacity and a rate increase, a PCB loss of a signal exchanged between the main chip and the optical module is increasingly large, and power consumption of the ODSP in the optical module is increasingly high. It is assumed that a chip process reaches a level of 5 nm, power consumption of a single optical module increases to 20 W, and power consumption of key ODSP accounts for about 50% of the power consumption of the single optical module. This brings great a difficulty in heat dissipation to the communication device.

In view of this, this disclosure provides a communication device, which may have a high-rate signal transmission capability, relatively low costs, and a low heat dissipation requirement. The following clearly describes the technical solutions in embodiments of this disclosure with reference to the accompanying drawings in embodiments of this disclosure.

Figure 2:
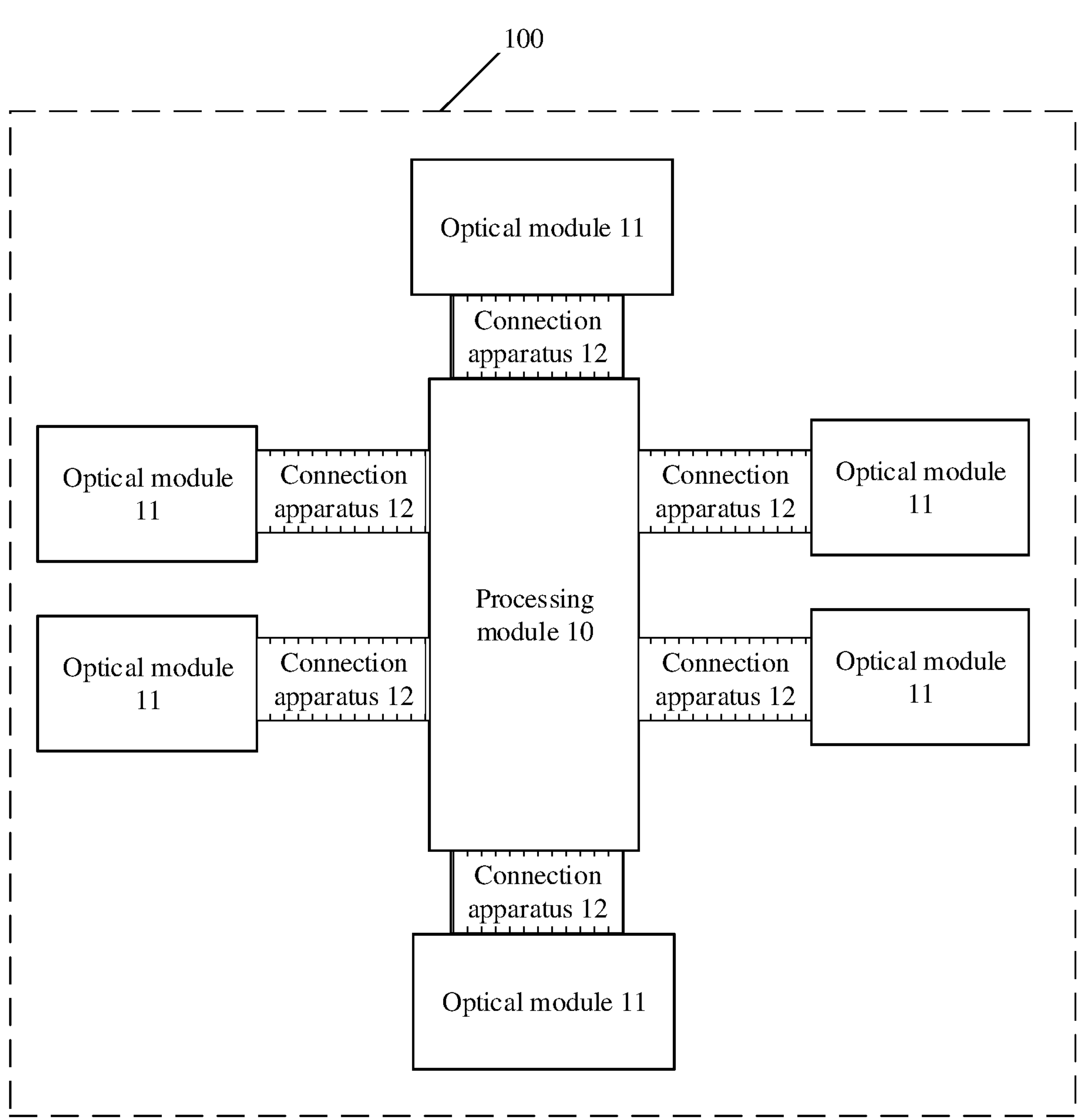
FIG. 2 is a schematic diagram of a structure of a communication device.

Referring to FIG. 2, a communication device 100 provided in this disclosure may include a processing module 10, at least one optical module 11, and at least one connection apparatus 12. The at least one optical module 11 may be in a one-to-one correspondence with the at least one connection apparatus 12. Each optical module 11 is connected to the processing module 10 by using a corresponding connection apparatus 12.

The processing module 10 may exchange an electrical signal with each optical module 11 by using the connection apparatus 12. For each optical module 11, the processing module 10 may provide an electrical signal for the optical module 11 by using the connection apparatus 12 corresponding to the optical module 11. The optical module 11 may convert the electrical signal into an optical signal, and then send the optical signal to the outside of the optical module 11. The optical module 11 mayalso receive an external optical signal, convert the optical signal into an electrical signal, and then transmit the electrical signal to the processing module 10 by using the connection apparatus 12.

In this embodiment of this disclosure, the connection apparatus 12 may be a low-loss transmission medium such as a coaxial cable or a flexible printed circuit (FPC), for example, a poly tetra fluoroethylene (PTFE) circuit board. The connection apparatus 12 may include a coaxial cable or a flexible printed circuit. This can reduce a total signal transmission loss or a signal transmission loss within a unit distance. In a scenario in which the optical modules have a same distance to the processing module 10, the connection apparatus 12 including the coaxial cable or the flexible printed circuit board is used to connect the optical module 11 and the processing module 10, and a total signal transmission loss may be less than a total signal transmission loss generated when the optical module 11 is connected to the processing module 10 by using a PCB. In a high transmission rate scenario, ODSP or CDR that has a high signal repair capability in the optical module 11 may not be required, and a bit error rate may also be ensured. It can be learned that the communication device 100 provided in this disclosure has low costs and a low heat dissipation requirement.

In the communication device 100, the processing module 10 may include a serializer/deserializer apparatus serializer/deserialize (serdes). In different signal transmission rate scenarios, the serdes in the processing module 10 may have different transmission capabilities.

In a possible implementation, the communication device 100 may be used in a scenario with a low signal transmission rate (for example, not exceeding 10 Gbps), and the serdes in the processing module 10 may be a serdes having a short-distance transmission capability of an electrical signal, for example, a serdes having a short-distance transmission I/O interface. In some examples, the short-distance transmission capability in this disclosure may be a capability of a very short reach interface discussed by the OIF. In some examples, the short-distance transmission capability in this disclosure may indicate energy or power of a signal exchanged between the serdes in the processing module 10 and the optical module 11, which conforms to energy or power of a signal exchanged between a main chip and the optical module 11 in a scenario that does not exceed 10 Gbps in an optical networking communication standard, for example, 12 dB.

In another possible implementation, the communication device 100 may be used in a high signal transmission rate scenario (exceeding 10 Gbps, for example, 25 Gbps, 56 Gbps, 100 Gbps, 112 Gbps, 400 Gbps or 800 Gbps), and the serdes in the processing module 10 may be a serdes having a medium-distance transmission capability of an electrical signal. In some examples, the medium-distance transmission capability in this disclosure may be a capability of a medium reach interface discussed by the OIF. In some examples, the medium-distance transmission capability in this disclosure may be energy or power of a signal exchanged between the serdes in the processing module 10 and the optical module 11, and conforms to energy or power of a signal exchanged between the main chip and the optical module 11 in a scenario that exceeds 10 Gbps in the optical networking communication standard, for example, 20 dB.

Alternatively, the serdes in the processing module 10 may be a serdes having a long-distance transmission capability of an electrical signal. In some examples, the long-distance transmission capability in this disclosure may be a capability of a long reach interface discussed by the OIF. In some examples, the long-distance transmission capability in this disclosure may be energy or power of a signal exchanged between the serdes in the processing module 10 and the optical module 11, and conforms to energy or power of a signal exchanged between the main chip and the optical module 11 in a scenario that exceeds 10 Gbps in the optical networking communication standard, for example, 28 dB.

Figure 3:
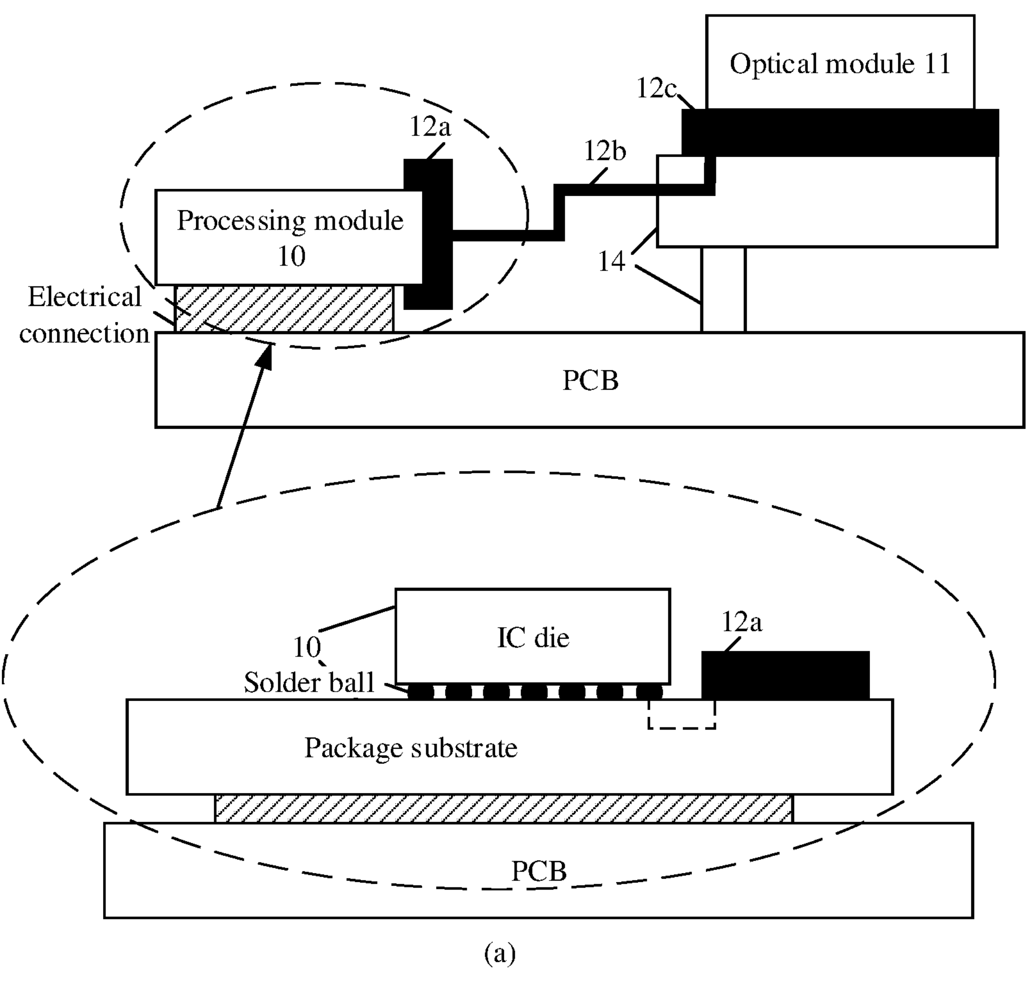
FIG. 3 is a schematic diagram of a structure of a communication device.
Figure 3:
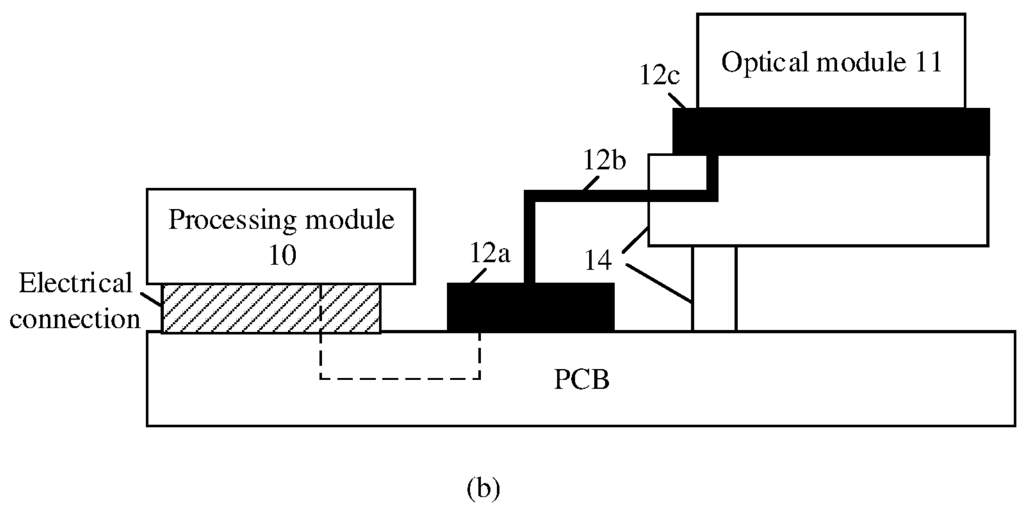

In a possible implementation, each connection apparatus 12 further includes one or more connectors. Referring to FIG. 3, each connection apparatus 12 may include a first connector 12*a*. In some examples, the processing module 10 in this disclosure is connected to the connection apparatus 12. The processing module 10 may be directly connected to the connection apparatus 12. As shown in (a) in FIG. 3, the first connector 12*a* may be disposed on the processing module 10. The processing module 10 may include a silicon chip (or a bare chip such as an IC Die) and a package substrate. The silicon chip is electrically connected to the package substrate, for example, welded to the package substrate. The first connector 12*a* may be disposed on the package substrate and then electrically connected to a processing circuit by using the package substrate (as shown by a dashed line).

In some examples, the processing module 10 is indirectly connected to the connection apparatus 12. The communication device 100 further includes a PCB. The processing module 10 may be connected to the PCB. For example, the processing module 10 may be welded to the PCB, or may be connected to the PCB by using the connector. The processing module 10 may alternatively be electrically connected to the PCB. The connection apparatus 12 is electrically connected to the PCB, so that the connection apparatus 12 is electrically connected to the processing module 10. As shown in (b) in FIG. 3, the first connector 12*a* may be disposed on a PCB in a communication system, and the processing module 10 may be electrically connected to the first connector 12*a* by using the PCB (as shown by a dashed line). Optionally, the package substrate in the processing module 10 may be electrically connected to the PCB in the communication system. The processing module 10 may be connected to the coaxial cable 12*b* (or FPC) by using the first connector 12*a*, and may receive and send signals by using the first connector 12*a* and the coaxial cable 12*b* (or FPC).

In a possible implementation, each connection apparatus 12 further includes a second connector 12*c*. The optical module 11 may be connected to the coaxial cable 12*b* (or FPC) by using the second connector 12*c*, and may receive and send signals by using the second connector 12*c* and the coaxial cable 12*b* (or FPC). The second connector 12*c* may be directly fastened to the PCB. The second connector 12*c* may alternatively be fastened to the PCB by using a fastening apparatus 14. In some examples, the second connector 12*c* may include a cage, to limit the optical module 11. An electrical interface connected to the optical module 11 and the second connector 12*c* may be considered as a golden finger. The optical module 11 may be inserted in or removed from the second connector 12*c*. In this way, the optical module 11 can be flexibly removed, replaced, or added in the communication device 100.

The optical module 11 is usually disposed at a position close to the processing module 10. For example, a distance between the optical module 11 and the processing module 10 may be less than or equal to a preset distance threshold. The preset distance threshold generally does not exceed 40 centimeters. In other words, in this embodiment of this disclosure, a length of the coaxial cable 12*b* may be less than or equal to 40 centimeters. In some examples, the preset distance threshold may be 30 centimeters. In other words, in this embodiment of this disclosure, the length of the coaxial cable 12*b* may be less than or equal to 30 centimeters.

In some examples, the communication device 100 further includes at least one fastening apparatus 14. The at least one fastening apparatus 14 may be in a one-to-one correspondence with the connection apparatus 12. Each connection apparatus 12 may be fastened to the PCB by using a corresponding fastening apparatus 14, so that the optical module 11 can highly adapt to the processing module 10. The optical module 11 may be connected to the connection apparatus 12. The connection apparatus 12 is directly fastened to the PCB, or is fastened to the PCB by using the fastening apparatus 14. Such a structure may be referred to as an on-board optics (OBO) module. In the communication device 100, the optical module 11 may be disposed at a position relatively close to the processing module 10. Such a structure may be referred to as a near package optics (NPO) module.

Based on a structure of the processing module 10 in any one of the foregoing implementations, the optical module 11 in the communication device 100 may be any existing optical module, that is, the optical module 11 may include the ODSP or the CDR. In some examples, the communication device 100 further includes at least one heat dissipation module. Each optical module 11 may have a corresponding heat dissipation module. A signal transmission loss of the connection apparatus 12 is low, and energy or power of a signal exchanged between the optical module 11 and the processing module 10 is high. Therefore, the optical module 11 does not need to improve ODSP or CDR with a high signal capability, that is, power consumption required by the ODSP or the CDR does not increase. Therefore, the heat dissipation module in the communication device 100 does not need a strong heat dissipation capability.

Figure 4:
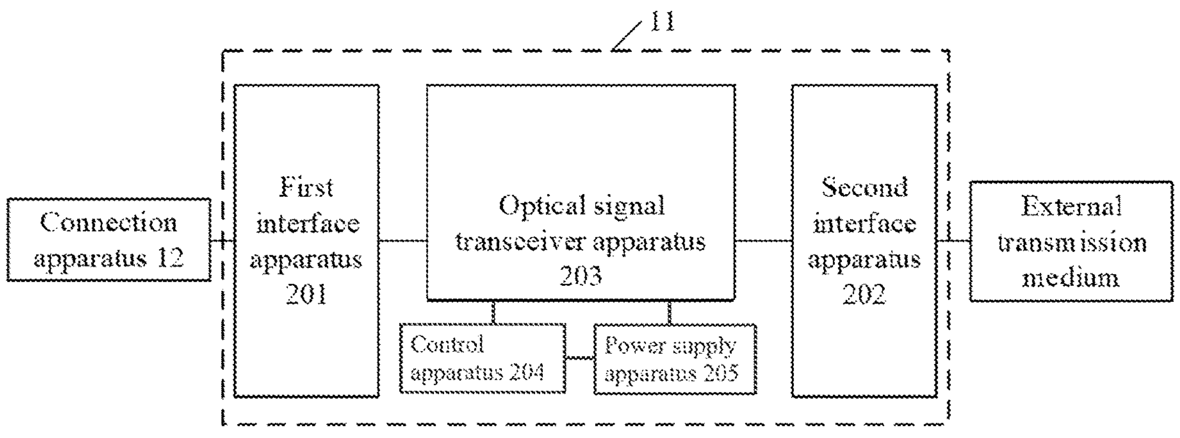
FIG. 4 is a schematic diagram of a structure of an optical module.

To reduce costs, a volume, or a heat dissipation requirement of the optical module 11, the optical module 11 in the communication device 100 may not have ODSP or CDR. This disclosure further provides an optical module 11. Referring to FIG. 4, the optical module 11 may include a first interface apparatus 201, a second interface apparatus 202, an optical signal transceiver apparatus 203, a control apparatus 204, and a power supply apparatus 205. The power supply apparatus 205 may supply power to the optical signal transceiver apparatus and the control apparatus 204. The power supply apparatus 205 may include a power supply.

The first interface apparatus 201 is connected to the connection apparatus 12, and is connected to the optical signal transceiver apparatus 203. The first interface apparatus 201 may transmit, to the optical signal transceiver apparatus 203, an electrical signal provided by the connection apparatus 12. The first interface apparatus 201 may alternatively transmit, to the connection apparatus 12, an electrical signal provided by the optical signal transceiver apparatus 203.

The second interface apparatus 202 is connected to the optical signal transceiver apparatus 203 and is connected to an external transmission medium (for example, an optical cable). The external transmission medium may transmit an optical signal. For example, the external transmission medium may be an optical cable. The second interface apparatus 202 may transmit, to the optical signal transceiver apparatus 203, an optical signal provided by the external transmission medium. The second interface apparatus 202 may alternatively transmit, to the external transmission medium, an optical signal provided by the optical signal transceiver apparatus 203.

The control apparatus 204 may control the optical signal transceiver apparatus 203. The optical signal transceiver apparatus 203 may convert an optical signal into an electrical signal under control of the control apparatus 204, and then output the electrical signal to the first interface apparatus 201. The optical signal transceiver apparatus 203 may alternatively convert an electrical signal into an optical signal under control of the control apparatus 204, and send the optical signal by using the second interface apparatus 202, so that the optical module 11 sends the optical signal, or the communication device 100 to which the optical module 11 belongs sends the optical signal. In some examples, the control apparatus 204 may include a microcontroller unit (MCU).

The first interface apparatus 201 in the optical module 11 provided in this embodiment of this disclosure may adapt to the foregoing connection apparatus 12. That is, the first interface apparatus 201 may be connected to a signal transmission medium such as the coaxial cable or the FPC (a signal transmission loss is less than a signal transmission loss of the PCB), so that the optical module 11 and the processing module 10 exchange a signal. Such an implementation can allow the signal exchanged between the optical module 11 and the processing module 10 to have high energy or power. The optical module 11 does not need to be provided with an ODSP or a CDR component for improving signal quality, to reduce the costs of the optical module 11, and reduce the volume of the optical module 11 and the heat dissipation requirement. In addition, the optical module 11 provided in this disclosure may not only be used in a low signal transmission rate scenario, but also be used in a high signal transmission rate scenario. The optical module 11 provided in this embodiment of this disclosure may be referred to as an ODSP-less architecture optical module.

The optical signal transceiver apparatus 203 may have a plurality of forms. The following describes a specific structure of the optical signal transceiver apparatus 203.

Figure 5:
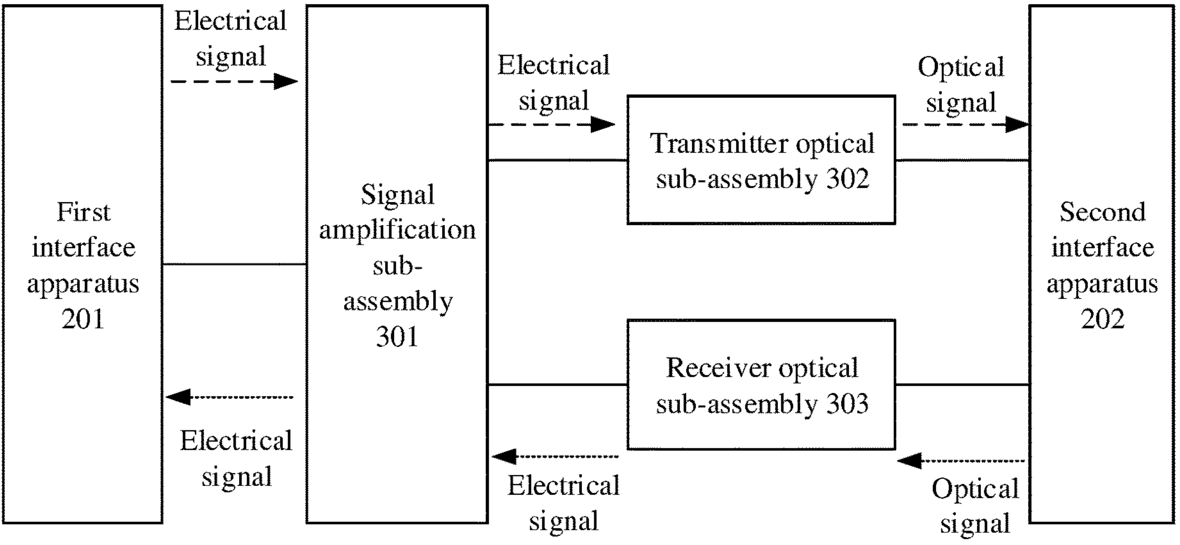
FIG. 5 is a schematic diagram of a structure of an optical module.

In a possible structure, as shown in FIG. 5, the optical signal transceiver apparatus 203 may at least include a signal amplification sub-assembly 301, a transmitter optical sub-assembly (TOSA) 302, and a receiver optical sub-assembly (ROSA) 303. A driver and a trans-impedance amplifier (TIA) may be integrated in the signal amplification sub-assembly 301. The signal amplification sub-assembly 301 may be connected to the transmitter optical sub-assembly 302 and connected to the receiver optical sub-assembly 303. The signal amplification sub-assembly 301 is further connected to the first interface apparatus 201. The transmitter optical sub-assembly 302 is connected to the second interface apparatus 202, and the receiver optical sub-assembly 303 is connected to the second interface apparatus 202.

The driver may drive the transmitter optical sub-assembly 302 under control of the control apparatus 204. The transmitter optical sub-assembly 302 may convert an electrical signal into an optical signal under driving of the driver, and send the optical signal by using the second interface apparatus 202. In some examples, the transmitter optical sub-assembly 302 may include an optical modulator and an optical source.

The receiver optical sub-assembly 303 may convert an optical signal into an electrical signal under control of the control apparatus 204, and then output the electrical signal to the trans-impedance amplifier in the signal amplification sub-assembly 301. The trans-impedance amplifier may amplify the electrical signal output by the receiver optical sub-assembly 303, and then output the electrical signal to the first interface apparatus 201, and may transmit the electrical signal to the processing module 10 by using the first interface apparatus 201 and the connection apparatus 12. In some examples, the receiver optical sub-assembly 303 may include a trans-impedance amplifier and a photodiode (PD). The receiver optical sub-assembly 303 may alternatively include a trans-impedance amplifier and an avalanche photodiode (APD).

Figure 6:
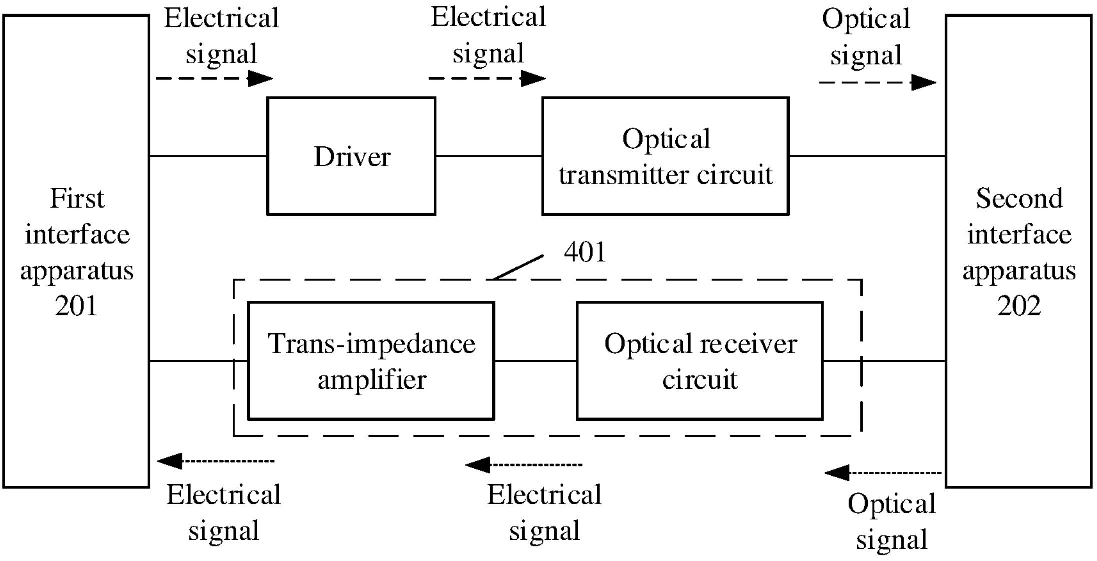
FIG. 6 is a schematic diagram of a structure of an optical module.

In another possible structure, as shown in FIG. 6, the optical signal transceiver apparatus 203 may at least include a first sub-assembly and a second sub-assembly 401. The first sub-assembly may include a driver and an optical transmitter circuit. The driver may drive the optical transmitter circuit under control of the control apparatus 204. The optical transmitter circuit may convert an electrical signal into an optical signal under driving of the driver, and then output the optical signal to the second interface apparatus 202. In some examples, the optical transmitter circuit may include an optical modulator and an optical source.

A trans-impedance amplifier and an optical receiver circuit are integrated in the second sub-assembly 401. The optical receiver circuit may convert an optical signal into an electrical signal under control of the control apparatus 204, and then output the electrical signal to the trans-impedance amplifier. The trans-impedance amplifier may amplify the electrical signal output by the optical receiver circuit, and then output the electrical signal to the first interface apparatus 201. In some examples, the optical receiver circuit may include a trans-impedance amplifier and a PD. The optical receiver circuit may alternatively include a trans-impedance amplifier and an APD.

Figure 7:
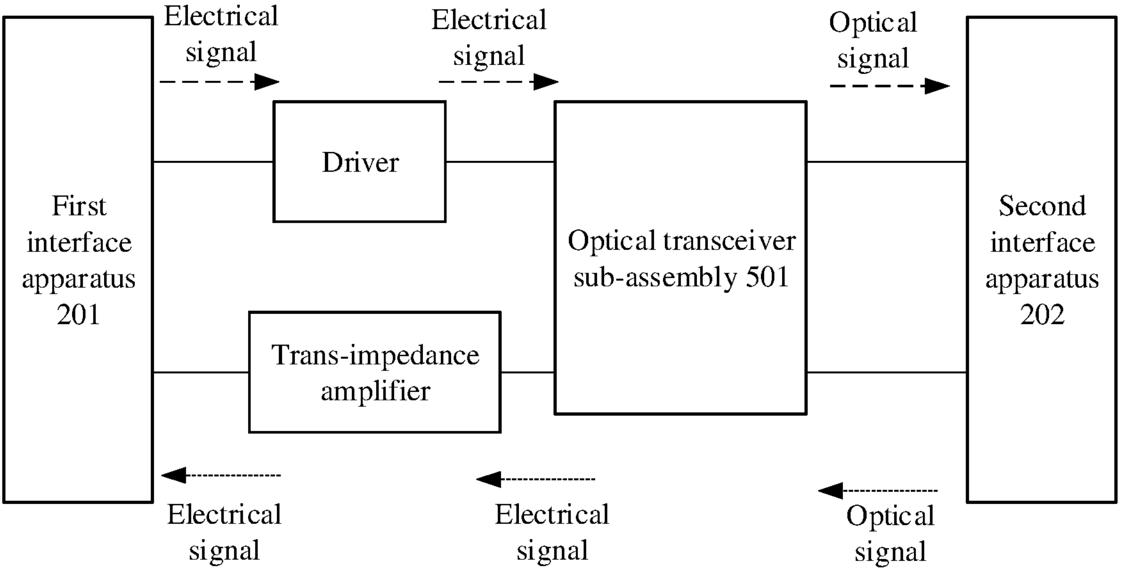
FIG. 7 is a schematic diagram of a structure of an optical module.

In still another possible structure, as shown in FIG. 7, the optical signal transceiver apparatus 203 may at least include a driver, a trans-impedance amplifier, and an optical transceiver sub-assembly 501. The driver is connected to the first interface apparatus 201, and is connected to the optical transceiver sub-assembly 501. The trans-impedance amplifier is connected to the first interface apparatus 201, and is connected to the optical transceiver sub-assembly 501. The optical transceiver sub-assembly 501 is connected to the second interface apparatus 202.

The optical transceiver sub-assembly 501 may convert an electrical signal into an optical signal under driving of the driver, and output the optical signal to the second interface apparatus 202, or convert an optical signal into an electrical signal under control of the control apparatus 204, and then output the electrical signal to the trans-impedance amplifier. The driver may drive the optical transceiver sub-assembly 501 under control of the control apparatus 204. The trans-impedance amplifier may amplify the electrical signal output by the optical transceiver sub-assembly 501, and then output the electrical signal to the first interface apparatus 201. It can be learned that the optical transceiver sub-assembly 501 may integrate functions or capabilities of the TOSA and the ROSA.

Based on any one of the foregoing possible structures, the apparatuses in the optical module 11 may be integrated into one chip. In addition, in some scenarios, the driver or the trans-impedance amplifier in the optical module 11 may have an equalization compensation capability, and may compensate for an electrical signal.

Figure 8:
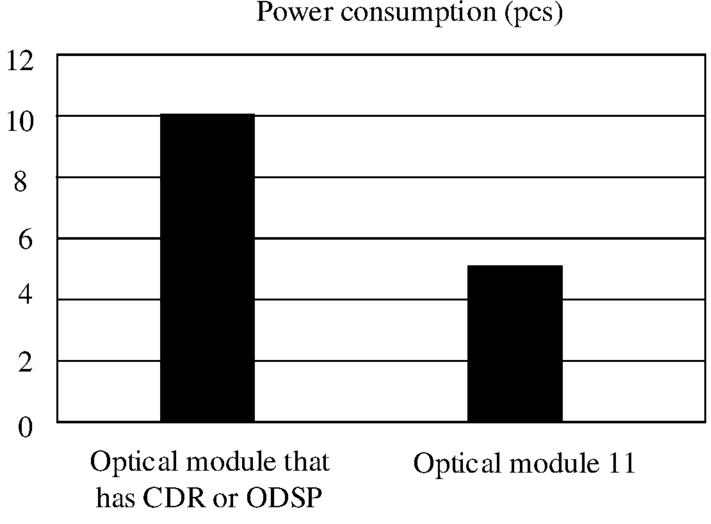
FIG. 8 is a schematic diagram of power consumption of an optical module.
Figure 9:
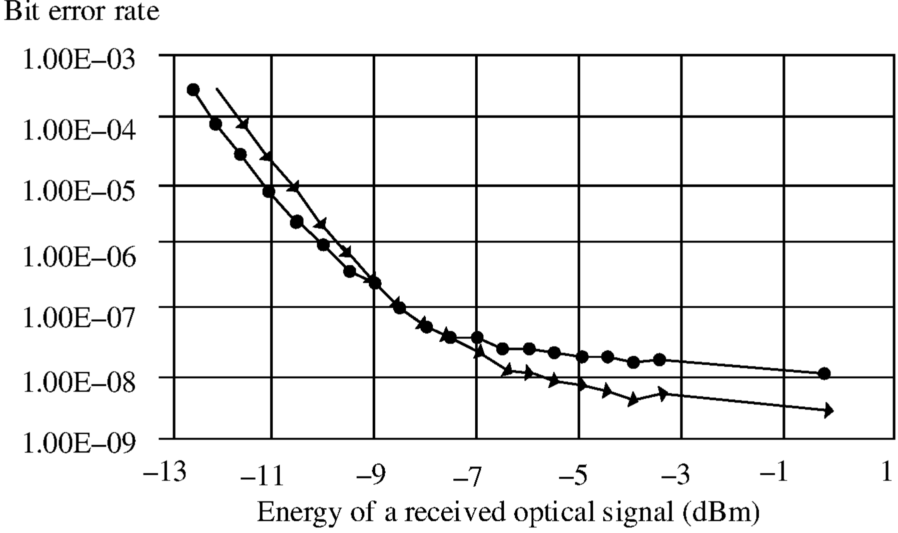
FIG. 9 is a schematic diagram of a relationship between energy of a received optical signal and a bit error rate.

This disclosure further provides a communication device, including any optical module 11, the connection apparatus 12, and the processing module 10 in FIG. 5 to FIG. 7. The processing module 10 includes a serdes having a long-distance transmission capability of an electrical signal. The communication device may be used in a high-speed signal transmission scenario of over 25 Gbps. The processing module 10 is connected to the optical module 11 by using a low-loss cable or a low-loss interconnection medium, to replace a conventional PCB interconnection manner, thereby effectively reducing a connection loss. With reference to the main chip serdes with a strong driving capability in the processing module 10, the optical module 11 may not need CDR or ODSP. FIG. 8 shows power consumption of the optical module provided in this embodiment of this disclosure and power consumption of an existing optical module having a CDR structure or an ODSP structure. In a scenario in which a signal transmission rate is 56 Gbps, FIG. 9 shows change of energy an optical signal received by a receiving end device and a bit error rate after the optical signal is sent by the communication device in two simulation conditions. It can be learned that the optical module 11 in the communication device provided in this embodiment of this disclosure can still ensure a bit error rate without a CDR structure or an ODSP structure.

Figure 10:
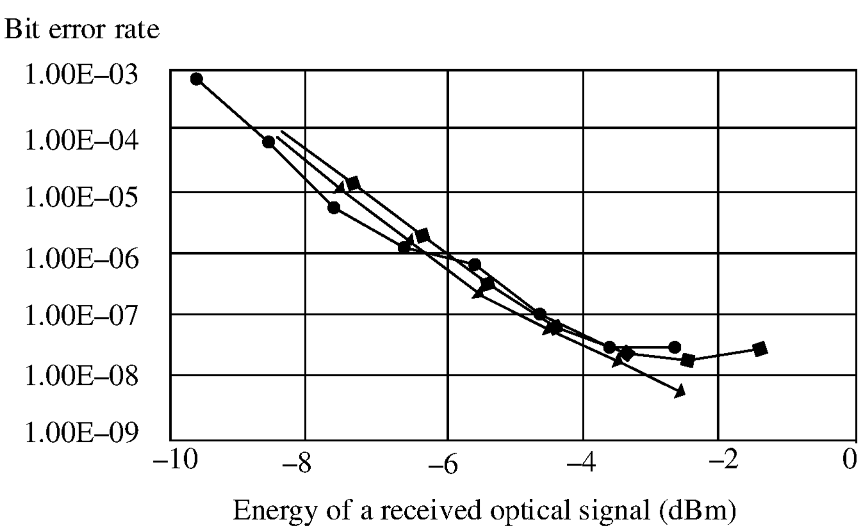
FIG. 10 is a schematic diagram of a relationship between energy of a received optical signal and a bit error rate.

When the communication device includes a plurality of optical modules 11, in a scenario in which a signal transmission rate is 112 Gbps, a status of energy and a bit error rate of optical signals received by the plurality of optical modules 11 at a same moment is shown in FIG. 10. The communication device provided in this disclosure can simultaneously ensure consistency of bit error rates in a plurality of channels of optical communication.

Based on the foregoing description, this disclosure further provides a communication device, and the communication device may include at least one optical module 11 provided in the foregoing embodiment. The optical module 11 does not have ODSP or CDR with a high signal improvement capability, and power consumption required for compensating for a signal does not increase. For example, the optical module 11 may be connected to the processing module 10 by using the connection apparatus 12 in the foregoing embodiment, and perform signal interaction with the processing module 10. In such an implementation, the communication device have a strong heat dissipation capability, and heat dissipation costs are reduced. In addition, the optical module 11 occupies small space, so that space occupied by the communication device may also be reduced. In some examples, the communication device may include the processing module 10 and the connection apparatus 12 in the foregoing embodiment. In some examples, the communication device may also include a heat dissipation apparatus configured to dissipate heat, and the heat dissipation apparatus may be configured to dissipate heat for the optical module 11. Optionally, the heat dissipation apparatus may be in a one-to-one correspondence with the optical module 11.

This disclosure further provides a communication system, and the communication system may include one or more communication devices provided in the foregoing embodiments. The communications devices may perform optical communication. The communication system may include at least one communication device provided in the foregoing embodiment, and another electronic device (denoted as a first device). The first device may be any existing optical communication device. For example, the first device may include an optical module having CDR or ODSP, and is connected to a main chip by using a PCB link. For another example, the first device may be any communication device provided in this embodiment of this disclosure.

Apparently, a person skilled in the art can make various modifications and variations to this disclosure without departing from the spirit and scope of this disclosure. This disclosure is intended to cover these modifications and variations of this disclosure provided that they fall within the scope of protection defined by the claims of this disclosure and their equivalent technologies.

What is claimed is:

1. A communication device comprising: a processing module, at least one optical module, and at least one connection apparatus, wherein each of the at least one optical module is connected to the processing module by using a corresponding one of the at least one connection apparatus;

the processing module is configured to: provide a first electrical signal for each of the at least one optical module, or receive a second electrical signal provided by the at least one optical module;

each of the at least one optical module is configured to: convert the first electrical signal provided by the processing module into a second optical signal and then send the second optical signal, or convert a received first optical signal into the second electrical signal and then provide the second electrical signal for the processing module; and the at least one connection apparatus corresponding to each of the at least one optical module is configured to: transmit the first electrical signal provided by the processing module to each of the at least one optical module, or transmit the second electrical signal provided by each of the at least one optical module to the processing module, wherein the at least one connection apparatus comprises a coaxial cable or a flexible printed circuit, and each of the at least one optical module has no optical digital signal processing (ODSP) sub-assembly or clock data recovery (CDR) sub-assembly, wherein each of the at least one optical module comprises a first interface apparatus, a second interface apparatus, an optical signal transceiver apparatus, a control apparatus, and a power supply apparatus;

the first interface apparatus is connected to the at least one connection apparatus and is connected to the optical signal transceiver apparatus, and is configured to: transmit, to the optical signal transceiver apparatus, the first electrical signal provided by the at least one connection apparatus, or transmit, to the at least one connection apparatus, the second electrical signal provided by the optical signal transceiver apparatus;

the second interface apparatus is connected to the optical signal transceiver apparatus and is connected to an external transmission medium, and is configured to: transmit, to the optical signal transceiver apparatus, the first optical signal provided by the external transmission medium, or is configured to; transmit, to the external transmission medium, the second optical signal provided by the optical signal transceiver apparatus, wherein the external transmission medium is configured to transmit the second optical signal;

the optical signal transceiver apparatus is configured to: convert the first optical signal into the second electrical signal under control of the control apparatus, and then output the second electrical signal to the first interface apparatus; or convert the first electrical signal into the second optical signal under control of the control apparatus, and send the second optical signal by using the second interface apparatus;

the power supply apparatus is configured to supply power to the optical signal transceiver apparatus and the control apparatus; and the control apparatus is configured to control the optical signal transceiver apparatus.

2. The communication device according to claim 1, wherein the processing module comprises a serializer/deserializer apparatus, and each of the at least one optical module is connected to the serializer/deserializer apparatus by using the corresponding one of at least one connection apparatus; and the serializer/deserializer apparatus has an electrical signal medium-distance transmission capability (MR) or an electrical signal long-distance transmission capability (LR).

3. The communication device according to claim 1, wherein each of the at least one optical module is detachably connected to the corresponding one of at least one connection apparatus.

4. The communication device according to claim 1, wherein the at least one connection apparatus corresponding to each of the at least one optical module further comprises a first connector; and the first connector is configured to connect the processing module and the coaxial cable or the flexible printed circuit.

5. The communication device according to claim 1, wherein the at least one connection apparatus corresponding to each of the at least one optical module further comprises a connector; and the connector is configured to connect a corresponding one of the at least one optical module and the coaxial cable or the flexible printed circuit.

6. The communication device according to claim 4, wherein:

the at least one connection apparatus corresponding to each of the at least one optical module further comprises a second connector, and the second connector is configured to connect a corresponding one of the at least one optical module and the coaxial cable or the flexible printed circuit;

the communication device further comprises a printed circuit board, wherein the processing module is disposed on the printed circuit board;

the first connector is located on the processing module or the printed circuit board; and/or the second connector is located on the printed circuit board, or the second connector is fastened to the printed circuit board by using a fastening apparatus.

7. The communication device according to claim 1, wherein a distance between each of the at least one optical module and the processing module is less than or equal to a preset distance threshold, and the preset distance threshold does not exceed 40 centimeters.

8. The communication device according to claim 1, wherein the optical signal transceiver apparatus comprises a signal amplification sub-assembly, a transmitter optical sub-assembly, and a receiver optical sub-assembly;

a driver and a trans-impedance amplifier are integrated in the signal amplification sub-assembly, the driver is configured to drive the transmitter optical sub-assembly under control of the control apparatus, and the trans-impedance amplifier is configured to: amplify the second electrical signal output by the receiver optical sub-assembly, and then output the second electrical signal to the first interface apparatus;

the transmitter optical sub-assembly is configured to: convert the first electrical signal into the second optical signal under driving of the driver, and send the second optical signal by using the second interface apparatus; and the receiver optical sub-assembly is configured to convert the first optical signal into the second electrical signal under control of the control apparatus.

9. The communication device according to claim 1, wherein the optical signal transceiver apparatus comprises a first sub-assembly and a second sub-assembly, wherein the first sub-assembly comprises a driver and a transmitter optical sub-assembly, the driver is configured to drive an optical transmitter circuit under control of the control apparatus, and the optical transmitter circuit is configured to: convert the first electrical signal into the second optical signal under driving of the driver, and then output the second optical signal to the second interface apparatus; and a trans-impedance amplifier and an optical receiver circuit are integrated in the second sub-assembly, the optical receiver circuit is configured to: convert the first optical signal into the second electrical signal under control of the control apparatus, and then output the second electrical signal to the trans-impedance amplifier, and the trans-impedance amplifier is configured to: amplify the second electrical signal output by a receiver optical sub-assembly, and then output the second electrical signal to the first interface apparatus.

10. The communication device according to claim 8, wherein the transmitter optical sub-assembly comprises an optical modulator and an optical source, and/or the receiver optical sub-assembly comprises a trans-impedance amplifier and a photodiode.

11. The communication device according to claim 1, wherein the optical signal transceiver apparatus comprises a driver, a trans-impedance amplifier, and an optical transceiver sub-assembly, wherein the optical transceiver sub-assembly is configured to: convert the first electrical signal into the second optical signal under driving of the driver, and then output the second optical signal to the second interface apparatus, or convert the first optical signal into the second electrical signal under control of the control apparatus, and then output the second electrical signal to the trans-impedance amplifier;

the driver is configured to drive the optical transceiver sub-assembly under control of the control apparatus; and the trans-impedance amplifier is configured to: amplify the second electrical signal output by the optical transceiver sub-assembly, and then output the second electrical signal to the first interface apparatus.

12. A communication system comprising: a communication device and a first device, wherein the first device exchanges an optical signal with the communication device;

wherein the communication device comprises: a processing module, at least one optical module, and at least one connection apparatus, wherein each of the at least one optical module is connected to the processing module by using a corresponding one of at least one connection apparatus;

the processing module is configured to: provide a first electrical signal for each of the at least one optical module, or receive a second electrical signal provided by the of the at least one optical module;

each optical module is configured to: convert the first electrical signal provided by the processing module into a second optical signal and then send the second optical signal, or convert a received first optical signal into a second electrical signal and then provide the second electrical signal for the processing module; and the at least one connection apparatus corresponding to each of the at least one optical module is configured to: transmit the first electrical signal provided by the processing module to each of the at least one optical module, or transmit the second electrical signal provided by each of the at least one optical module to the processing module, wherein the at least one connection apparatus comprises a coaxial cable or a flexible printed circuit, and each of the at least one optical module has no optical digital signal processing (ODSP) sub-assembly or clock data recovery (CDR) sub-assembly, wherein each of the at least one optical module comprises a first interface apparatus, a second interface apparatus, an optical signal transceiver apparatus, a control apparatus, and a power supply apparatus, the first interface apparatus is connected to the at least one connection apparatus and is connected to the optical signal transceiver apparatus, and is configured to: transmit, to the optical signal transceiver apparatus, the first electrical signal provided by the at least one connection apparatus, or transmit, to the at least one connection apparatus, the second electrical signal provided by the optical signal transceiver apparatus the second interface apparatus is connected to the optical signal transceiver apparatus and is connected to an external transmission medium, and is configured to: transmit, to the optical signal transceiver apparatus, the first optical signal provided by the external transmission medium, or is configured to: transmit, to the external transmission medium, the second optical signal provided by the optical signal transceiver apparatus, wherein the external transmission medium is configured to transmit the second optical signal, the optical signal transceiver apparatus is configured to: convert the first optical signal into the second electrical signal under control of the control apparatus, and then output the second electrical signal to the first interface apparatus; or convert the first electrical signal into the second optical signal under control of the control apparatus, and send the second optical signal by using the second interface apparatus;

the power supply apparatus is configured to supply power to the optical signal transceiver apparatus and the control apparatus; and the control apparatus is configured to control the optical signal transceiver apparatus.

13. An optical module used in a communication device, the optical module comprising: a first interface apparatus, a second interface apparatus, an optical signal transceiver apparatus, a control apparatus, and a power supply apparatus, wherein the first interface apparatus is connected to a connection apparatus and is connected to the optical signal transceiver apparatus, and is configured to: transmit, to the optical signal transceiver apparatus, a first electrical signal provided by the connection apparatus, or transmit, to the connection apparatus, a second electrical signal provided by the optical signal transceiver apparatus, wherein the connection apparatus comprises a coaxial cable or a flexible printed circuit;

the second interface apparatus is connected to the optical signal transceiver apparatus and is connected to an external transmission medium, and is configured to: transmit, to the optical signal transceiver apparatus, a first optical signal provided by the external transmission medium, or is configured to: transmit, to the external transmission medium, a second optical signal provided by the optical signal transceiver apparatus, wherein the external transmission medium is configured to transmit the second optical signal;

the optical signal transceiver apparatus is configured to: convert the first optical signal into the second electrical signal under control of the control apparatus, and then output the second electrical signal to the first interface apparatus; or convert the first electrical signal into the second optical signal under control of the control apparatus, and send the second optical signal by using the second interface apparatus;

the power supply apparatus is configured to supply power to the optical signal transceiver apparatus and the control apparatus; and the control apparatus is configured to control the optical signal transceiver apparatus, wherein the optical module has no optical digital signal processing (ODSP) sub-assembly or clock data recovery (CDR) sub-assembly.

14. The optical module according to claim 13, wherein the first interface apparatus is detachably connected to the connection apparatus.

15. The optical module according to claim 13, wherein the optical signal transceiver apparatus comprises a signal amplification sub-assembly, a transmitter optical sub-assembly, and a receiver optical sub-assembly;

a driver and a trans-impedance amplifier are integrated in the signal amplification sub-assembly, the driver is configured to drive the transmitter optical sub-assembly under control of the control apparatus, and the trans-impedance amplifier is configured to: amplify the second electrical signal output by the receiver optical sub-assembly, and then output the second electrical signal to the first interface apparatus;

the transmitter optical sub-assembly is configured to: convert the first electrical signal into the second optical signal under driving of the driver, and send the second optical signal by using the second interface apparatus; and the receiver optical sub-assembly is configured to convert the first optical signal into the second electrical signal under control of the control apparatus.

16. The optical module according to claim 13, wherein the optical signal transceiver apparatus comprises a first sub-assembly and a second sub-assembly, wherein the first sub-assembly comprises a driver and a transmitter optical sub-assembly, the driver is configured to drive an optical transmitter circuit under control of the control apparatus, and the optical transmitter circuit is configured to: convert the first electrical signal into the second optical signal under driving of the driver, and then output the second optical signal to the second interface apparatus; and a trans-impedance amplifier and an optical receiver circuit are integrated in the second sub-assembly, the optical receiver circuit is configured to: convert the first optical signal into the second electrical signal under control of the control apparatus, and then output the second electrical signal to the trans-impedance amplifier, and the trans-impedance amplifier is configured to: amplify the second electrical signal output by a receiver optical sub-assembly, and then output the second electrical signal to the first interface apparatus.

17. The optical module according to claim 15, wherein the transmitter optical sub-assembly comprises an optical modulator and an optical source, and/or the receiver optical sub-assembly comprises a trans-impedance amplifier and a photodiode.

18. The optical module according to claim 13, wherein the optical signal transceiver apparatus comprises a driver, a trans-impedance amplifier, and an optical transceiver sub-assembly, wherein the optical transceiver sub-assembly is configured to: convert the first electrical signal into the second optical signal under driving of the driver, and then output the second optical signal to the second interface apparatus, or convert the first optical signal into the second electrical signal under control of the control apparatus, and then output the second electrical signal to the trans-impedance amplifier;

the driver is configured to drive the optical transceiver sub-assembly under control of the control apparatus; and the trans-impedance amplifier is configured to: amplify the second electrical signal output by the optical transceiver sub-assembly, and then output the second electrical signal to the first interface apparatus.

19. A communication device comprising: a optical module, wherein the optical module comprises a first interface apparatus, a second interface apparatus, an optical signal transceiver apparatus, a control apparatus, and a power supply apparatus, wherein the first interface apparatus is connected to a connection apparatus and is connected to the optical signal transceiver apparatus, and is configured to: transmit, to the optical signal transceiver apparatus, a first electrical signal provided by the connection apparatus, or transmit, to the connection apparatus, a second electrical signal provided by the optical signal transceiver apparatus, wherein the connection apparatus comprises a coaxial cable or a flexible printed circuit;

the second interface apparatus is connected to the optical signal transceiver apparatus and is connected to an external transmission medium, and is configured to: transmit, to the optical signal transceiver apparatus, a first optical signal provided by the external transmission medium, or is configured to: transmit, to the external transmission medium, a second optical signal provided by the optical signal transceiver apparatus, wherein the external transmission medium is configured to transmit the second optical signal;

the optical signal transceiver apparatus is configured to: convert the first optical signal into the second electrical signal under control of the control apparatus, and then output the second electrical signal to the first interface apparatus; or convert the first electrical signal into the second optical signal under control of the control apparatus, and send the second optical signal by using the second interface apparatus;

the power supply apparatus is configured to supply power to the optical signal transceiver apparatus and the control apparatus; and the control apparatus is configured to control the optical signal transceiver apparatus, wherein the optical module has no optical digital signal processing (ODSP) sub-assembly or clock data recovery (CDR) sub-assembly.

* * * * *